United States Patent
Rogers

[11] Patent Number: 6,143,042
[45] Date of Patent: Nov. 7, 2000

[54] METHOD OF MAKING FILMS AND LAMINATED CELL STRUCTURES

[75] Inventor: Marc W. Rogers, Las Vegas, Nev.

[73] Assignee: Delphi Technologies, Inc., Troy, Mich.

[21] Appl. No.: 09/136,385

[22] Filed: Aug. 19, 1998

[51] Int. Cl.[7] .................................................. H01M 06/00
[52] U.S. Cl. ...................... 29/623.1; 29/623.3; 29/623.5; 429/212; 429/249
[58] Field of Search .................................. 29/623.1, 623.5, 29/623.2, 623.4, 623.3; 429/212, 249

[56] References Cited

U.S. PATENT DOCUMENTS

| | | | |
|---|---|---|---|
| 4,434,028 | 2/1984 | Eppig et al. | 196/14.52 |
| 4,437,938 | 3/1984 | Bhise et al. | 203/14 |
| 4,466,923 | 8/1984 | Friedrich | 260/412.4 |
| 5,418,091 | 5/1995 | Gozdz et al. | 429/252 |
| 5,456,000 | 10/1995 | Gozdz et al. | 29/623.5 |
| 5,460,904 | 10/1995 | Gozdz et al. | 429/192 |
| 5,540,741 | 7/1996 | Gozdz et al. | 29/623.5 |
| 5,670,273 | 9/1997 | Velasquez et al. | 429/162 |
| 5,756,230 | 5/1998 | Gao et al. | 429/192 |
| 5,759,215 | 6/1998 | Masuda | 29/623.2 |
| 5,961,671 | 10/1999 | Guindy et al. | 29/623.1 |

OTHER PUBLICATIONS

Supercritical Fluid Technology: Reviews in Modern Theory and Applications, Editors T. J. Bruno and J. F. Ely, CRC Press 1991, pp. 494–495.

*Primary Examiner*—Maria Nuzzolillo
*Assistant Examiner*—Raymond Alejandro
*Attorney, Agent, or Firm*—Linda M. Deschere

[57] ABSTRACT

In the method of the invention, plasticizer is extracted from a polymeric film electrode, electrolyte or laminated film structure thereof, by contacting the film, with an extraction solvent mixture comprising a polar co-solvent, and carbon dioxide which is in a solvent fluidic state, at a temperature greater than or equal to 31° C. and less than 35° C. The pressure of extraction is sufficient to maintain the fluidic state at the temperature range stated. The co-solvent is present in an amount up to about 10% by weight of the extraction solvent mixture. The co-solvent is characterized by having a liquid state at the temperature and pressure of extraction.

23 Claims, 3 Drawing Sheets

METHOD OF MAKING FILMS AND LAMINATED CELL STRUCTURES

FIELD OF THE INVENTION

The present invention relates to primary and secondary electrochemical cells, and particularly cells having polymeric electrolyte/separator films, and preferred electrode comprising polymeric binder forming a matrix for retaining active material.

BACKGROUND OF THE INVENTION

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility. Strong, flexible polymeric electrolytic cell separator membrane materials retain electrolyte lithium salt solutions and remain functional over temperatures ranging well below room temperature. These electrolyte membranes are used either in the usual manner as separator elements with mechanically assembled battery cell components, or in composite battery cells constructed of successively coated layers of electrode and electrolyte compositions.

A typical laminated battery cell structure 10 is depicted in FIG. 1. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

In another embodiment, a multicell battery configuration as per FIG. 2 is prepared with copper current collector 51, negative electrode 53, electrolyte/separator 55, positive electrode 57, and aluminum current collector 59. Tabs 52 and 58 of the current collector elements form respective terminals for the battery structure.

In each of these implementations, cell performance depends, at least in part, on the removal of impurities and intermediate constituents. Any material not essential to cell performance is preferably completely removed, yet such removal is difficult to accomplish.

SUMMARY OF THE INVENTION

The invention provides a new method for removing the plasticizer from a polymeric film or laminated structure comprising films. The film, or laminate comprising multiple layers of film, is contacted with an extractant and preferably a co-solvent. The extractant is normally a gas, but is under conditions of pressure and temperature providing the extractant in a supercritical, fluidic, solvent state, whereby the plasticizer is transferred to the extractant phase. The extractant containing the plasticizer is depressurized, whereby it is rendered to a non-solvent condition. Here, two phases are formed. The first phase is a gaseous phase of the extractant, which then may be recycled and repressurized for reuse. The second phase is a liquid containing the plasticizer. The liquid phase may also comprise the co-solvent.

More specifically, in the method of the invention the plasticizer is extracted from a polymeric film by contacting the film with an extraction solvent mixture comprising a polar co-solvent, and carbon dioxide which is in a solvent fluidic state, at a temperature greater than or equal to 31° C. and less than 35° C. The pressure of extraction is sufficient to maintain the fluidic state at the temperature range stated. The co-solvent is present in an amount up to about 10% by weight of the extraction solvent mixture. The co-solvent is characterized by having a liquid state at the temperature and pressure of extraction.

Extraction occurs at a pressure in a range of about 1,800 to about 2,500 psi; more desirably in a range of about 1,800 to about 2,200 psi; preferably in a range of about 1,850 to about 2,200 psi; and most preferably in a range of about 1,800 psi to about 1,900 psi. The temperature of extraction is desirably in a range of 31° C. to 34° C.; more desirably in a range of 32° C. to 34° C., preferably in a range of 32.5° C. to 33.5° C.; and most preferably the temperature is about 33° C.

The co-solvent used with the supercritical carbon dioxide is an organic polar solvent selected from the group consisting of alcohols, ethers, and ketones. It is preferred that the co-solvent is selected from the group consisting of methyl alcohol, ethyl alcohol, propyl alcohol, butyl alcohol and mixtures thereof.

In the method of the invention, the co-solvent preferably has a boiling point of at least 50° C. at atmospheric pressure (760 mmHg) and a molecular weight less than 200.

In the method of the invention, it is possible to extract plasticizer from a variety of polymeric film materials formed from polymers and copolymers. The polymer may be selected from the group consisting of polymer and copolymers of vinyl chloride, acrylonitrile, vinyl chloride and vinylidene chloride, vinyl chloride and acrylonitrile, vinylidene flouride, vinylidene flouride with hexaflouropropylene, vinylidene flouride with hexaflouropropylene and a member of the group consisting of vinyl flouride, tetraflouroethylene, and triflouroethylene, and mixtures thereof. Most preferably the polymeric material is a copolymer of vinylidene flouride (VF) and hexaflouropropylene (HFP).

The method of the invention is advantageously usable with a variety of plasticizers (PL) including those selected from the group consisting of dibutyl phthalate, dimethyl phthalate, diethyl phthalate, trisbutoxythyl phosphate, propylene carbonate, ethylene carbonate, trimethyl trimellitate and mixtures thereof. In the extraction process, the weight ratio of $CO_2$ to plasticizer, $CO_2$: PL is preferably in a range of 200:1 to 400:1. The method is particularly useful to extract the plasticizer dibutyl phthalate from polymeric material which comprises a copolymer of vinylidene flouride and hexaflouropropylene. Here, a suitable range of temperatures, pressures and $CO_2$: DBP are as stated above. In the case where the plasticizer is dibutyl phthalate, the weight ratio of $CO_2$: DBP is preferably in a range of 200:1 to 400:1.

The invention provides substantial advantages over conventional methods of forming electrochemical cells due to the effective and economical process provided for plasticizer extraction. Objects, features, and advantages of the invention include an improved electrochemical cell or battery based particularly on lithium, which has improved charging and discharging characteristics; and which maintains its integrity over a prolonged life cycle as compared to presently used cells. Another object is to provide stabilized electrochemical cells which are stabilized against decomposition of cell components, and particularly degradation of the binder included in electrode elements and electrolyte/separator elements.

These and other objects, features, and advantages will become apparent from the following description of the preferred embodiments, claims, and accompanying drawings.

DETAILED DESCRIPTION OF THE PREFERRED EMBODIMENTS

Figure 1:
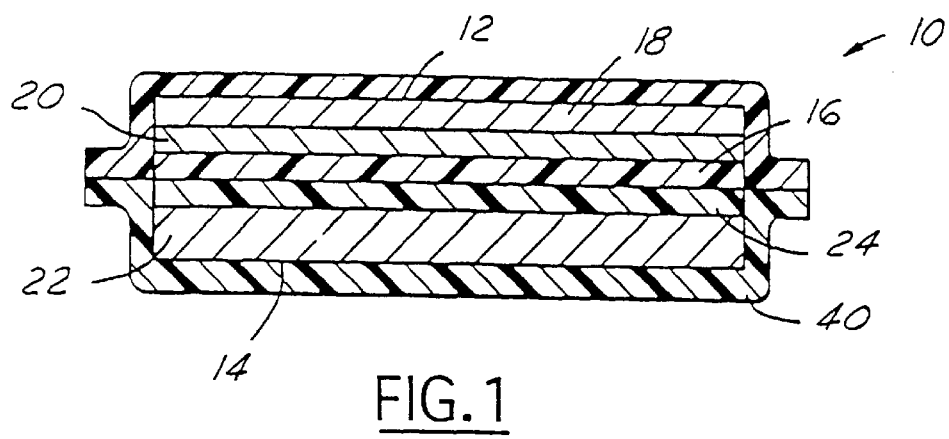
FIG. 1 is an illustration of a cross-section of a thin battery or cell embodying the invention.

The invention provides an effective, economical means to extract plasticizer from cell films and laminated structures prepared from such films. In the method of the invention, plasticizer is removed from a polymeric film using an extractant in a fluidic state. The film, or laminate comprising multiple layers of film, is transferred to a pressure vessel and contacted with the extractant. The extractant is normally a gas, but is under conditions of pressure and temperature providing the extractant in a supercritical fluidic solvent state, whereby the plasticizer is transferred to the extractant. A co-solvent is preferably used with the extractant. The extractant containing the plasticizer exits the pressure vessel and is depressurized, whereby it is rendered to a non-solvent condition. Here, two phases are formed. The first phase is a gaseous phase of the extractant, which then may be recycled and repressurized for reuse. The second phase is a liquid containing the plasticizer. The liquid phase may also comprise the co-solvent.

The extractant used in the present method is in a gaseous state at normal pressure and temperature, and is converted to a solvent, fluidic state by subjecting it to a combination of pressure and temperature, which changes its physical state.

In the method of the invention, supercritical fluids technology has been adapted to effectively extract plasticizer from polymeric electrochemical cell components. Supercritical fluids (SCF) are often referred to as dense gasses. Technically, an SCF is a fluid existing above its critical temperature and critical pressure, as defined in the phase diagram of the pure substance. When a gas is compressed above its critical temperature, densities increase dramatically. Therefore, under a given set of conditions, an SCF may possess the density of a liquid while maintaining the diffusivity of a gas. More specifically, a phase is considered a gas if it can be condensed by a reduction of temperature at constant pressure. A phase is generally considered to be a liquid if it can be vaporized by a reduction in pressure at constant temperature. Since the fluid region fits neither of these definitions, it can be called neither a gas nor a liquid. Since carbon dioxide has a critical temperature of 31.1° C., and a critical pressure of 73 atmospheres, beyond this critical point, carbon dioxide is described as a supercritical fluid. The use of normally gaseous materials in their near-critical or supercritical states as solvents has been known. Examples of critical and supercritical extraction include U.S. Pat. No. 4,434,028 describing extraction of organics from drilling mud; U.S. Pat. No. 4,437,938, which describes recovering ethylene oxide from aqueous solutions; and U.S. Pat. No. 4,466,923, which describes recovering lipids from grains. Each of the aforesaid patents is incorporated by reference herein in its entirety. According to such art, the terms "near-critical" and "supercritical" are known and may include reduced temperatures in ranges as defined in U.S. Pat. No. 4,437,938. The general ability of various gasses, to serve as extractants, as a liquid in near-critical state, and as a fluid in supercritical state is as described in '938, '923, and '028. Therefore, general background describing extraction with the supercritical fluids will not be repeated here.

The extractant used in the method of this invention is carbon dioxide, having a critical temperature ($T_c$) of 31.1° C. and a critical pressure ($P_c$) of about 73 atmospheres. Carbon dioxide is an advantageous extractant since it is relatively inexpensive, non-polluting, and is a relatively good solvent within the pressure and temperature ranges of the invention, without imposing significant requirements on the mechanical systems involved in the extraction process. Although it is known that carbon dioxide may be maintained in the desired fluidic state under pressures between about 50 and 220 atmospheres, and at temperatures between about 15° C. and about 150° C., the ability of carbon dioxide to serve as an extractant for plasticizer is highly dependent on certain operating parameters heretofore not understood and not heretofore appreciated.

A co-solvent used with the carbon dioxide extractant is an organic polar solvent which has a boiling point at 760 mm Hg which is at a temperature greater than the fluid state temperature of the $CO_2$ extractant in the extraction vessel. In other words, if the extraction temperature is at the preferred 33° C., then the organic polar co-solvent has a boiling point at 760 mm Hg which is greater than 33° C. It is preferred that the co-solvent be selected from the group consisting of alcohol, ether and ketones. It is preferred that the co-solvent be an alcohol selected from the group consisting of methyl alcohol, ethyl alcohol, propyl alcohol, butyl alcohol, and mixtures thereof. It is preferred that the co-solvent has a boiling point of at least 50° C. at atmospheric pressure (760 mm Hg) and a molecular weight less than 200. Most preferably, the boiling point is about 50° C. to about 90° C. at 760 mm Hg.

Preferably, the co-solvent has a density at 20° C. of about 0.7 to about 0.9 g/cc at one atmosphere.

Before further describing the invention, it is useful to understand the present approach to forming cells and conventional methods resulting in incomplete extraction of plasticizer which presently occurs. Electrolytic cell electrode and separator elements utilizing polymeric materials comprise a combination of a copolymer matrix and a compatible organic solvent plasticizer which maintains a homogeneous composition in the form of a flexible, self-supporting film. A particularly favored and exemplary copolymer is a combination of vinylidene fluoride (VdF) and hexafluoropropylene (HFP). Formulations presently used typically comprise 12–15 molar parts HFP, and the balance, 85–88 molar parts, the VdF.

The invention is not limited to any particular polymer or plasticizer composition. Among the most useful elastomeric copolymers are: copolymers of vinylidene fluoride (VdF) and hexafluoropropylene (HFP), chlorotrifluoroethylene or pentafluoropropylene, and copolymers of vinylidene fluoride, tetrafluoroethylene and hexafluoropropylene or pentafluoropropylene. "Copolymer" herein means the product of copolymerizing two or more monomers. Especially preferred are vinylidene fluoride/hexafluoropropylene copolymers in which the monomers are combined in a molar ratio of at least about 90:10 of VdF:HFP. The copolymer can also be any other vinylidene fluoride copolymer fluoroelastomer which can be cured to useful products, for example copolymers of vinylidene fluoride with dichlorodifluoroethylene or chlorofluoroethylene, with fluorinated vinyl esters, with derivatives of perfluoroacrylic acid, and with fluorinated alkyl vinyl ethers; the latter can be illustrated by copolymers of vinylidene fluoride and a perfluoroalkyl perfluorovinyl ether as described in U.S. Pat. No. 3,136,745, and copolymers of vinylidene fluoride, tetrafluoroethylene and said ether as described in U.S. Pat. No. 3,235,537. Useful copolymers of vinylidene fluoride and 1,2,3,3,3-pentafluoropropylene are described in U.S. Pat. No. 3,331,823, and copolymers of these two components with tetrafluoroethylene are described in U.S. Pat. No. 3,335,106. Other fluorinated monomers useful as binders are ethylenically unsaturated monomers containing at least as many fluorine atoms as carbon atoms. The above are described in U.S. Pat. No. 3,876,654; 3,894,118; 4,200,568; 4,489,196; and 4,496,682; each of which is incorporated by reference herein in its entirety.

In one approach, electrolytic cells are conventionally constructed by lamination of electrode and electrolyte cell elements which are individually prepared by coating, extrusion, or otherwise from compositions comprising the exemplary VdF:HFP copolymer. For example, in the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as $LiMn_2O_4$ (LMO), $LiCoO_2$, or $LiNiO_2$, powder in a copolymer matrix solution, which is dried to form the positive electrode. An electrolyte/separator membrane is formed as a dried coating of a composition comprising a solution containing the exemplary VdF:HFP copolymer, and a plasticizer is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the exemplary VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

In conventional methods, the laminate structure comprises the organic plasticizer but does not yet contain any of the hygroscopic electrolyte salt. As a result, in this condition the cell is considered inactive and may be stored at ambient conditions without concern for electrolyte deterioration. In the final stages, the electrolyte salt solution is added during the final sealing operation in a protective atmosphere. When it is desired to so activate the battery in this final stage of manufacture, one of two procedures may be followed. In order to facilitate absorption of electrolyte solution, some or all of the plasticizer may be removed from the cell prior to adding the lithium salt electrolyte solution to activate the cell.

In another variation, it is also possible to remove the plasticizer from any one of the film components after forming the film and before or after lamination. For example, if desired, it is possible to remove the plasticizer only from the separator. Films with retained high boiling point plasticizer solvent are referred to as "wet" form. The films from which the plasticizer has been extracted represents a "dry" form of a membrane or film material. Obviously, some or all of the plasticizer may be removed from the electrode film, if desired, after the film is formed. Typically, a film is formed by casting from solution or by other means. Therefore, extraction of the plasticizer can be accomplished any time following the formation of the films, and before or after lamination.

It is understood that the individual films or the laminate structure may be stored in either plasticize or extracted form for any period of time prior to activation. It is preferred to cast the electrode and electrolyte films, laminate them as described earlier, and then remove the plasticizer from the laminate. This usually is more efficient than making and storing individual films. Although a plasticized copolymer matrix will imbibe an electrolyte salt solution, displacing the plasticizer solvent, it is preferable to extract the plasticizer to facilitate absorption of fluid electrolyte by the films.

Those skilled in the art understand that the film of any one of positive electrode, negative electrode, and polymeric separator membrane is formed by a variety of methods. One alternative is casting from a solvent slurry comprising the polymeric material and plasticizer in a casting solvent and then evaporating the casting solvent to form a thin polymeric film. In another alternative, the film of any one of positive electrode, negative electrode, and electrolyte separator is formed by pressing at an elevated temperature a mixture comprising the polymeric material and plasticizer into a thin polymeric film. In still another alternative, the film of any one of the positive electrode, negative electrode, and separator membrane is formed by pressing, at an elevated temperature, a mixture comprising the plasticizer and polymeric material to form a solid body and then skiving off a thin film from the body. Such skiving may be on a lathe via a sharp edge, such as a knife. Examples of film formation, lamination and extraction alternatives are described in U.S. Pat. Nos. 5,418,091; 5,460,904; 5,456,000; and 5,540,741 assigned to Bell Communications Research, each of which is incorporated by reference in its entirety, herein. The '091, '904, '741 and '000 patents referenced and incorporated herein, describe film compositions containing VdF:HFP molar ratios of 85:15 and 88:12. The VdF:HFP copolymer is also referred to in the literature as poly(VF$_2$/HFP). Such preferred 88:12 and 85:15 VdF:HFP compositions are sold under the registered trademark Kynar Flex copolymer, available commercially from Atochem North America. The 88:12 molar ratio is designated as Flex 2801 and the 85:15 molar ratio is designated as Flex 2750. (See U.S. Pat. No. 5,418,091 previously incorporated herein by reference in its entirety.) There is a relatively broad range of electrode and electrolyte separator compositions with which the copolymer binder is utilized. The relative weight proportions of the components of the positive electrode are generally: 50–90% by weight active material; 5–30% carbon black as the electric conductive diluent; and 3–20% binder chosen to hold all active materials in contact with one another without degrading ionic conductivity. The negative electrode comprises about 60–95% by weight of a preferred graphite, with the balance constituted by the binder. Stated ranges are not critical and the amount of active material in an electrode may range up to about 95 weight percent. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion.

The plasticizing solvent is not critical and may be one of the various organic compounds commonly used, for example, propylene carbonate, ethylene carbonate, higher-boiling plasticizer compounds such as dibutyl phthalate, dimethyl phthalate, and diethyl phthalate. Inorganic filler additives such as fumed alumina or silanized fumed silica, may be used to enhance the physical strength and melt viscosity of a separator membrane, and in some compositions to increase the level of electrolyte solution absorption. Those skilled in the art will understand that any number of methods may be used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means. by pressing between metal plates at a temperature of about 120–160° C. Subsequent to lamination, the battery cell material may be stored either with the retained plasticizer or as a dry sheet after extraction of the plasticizer with a selective low-boiling point solvent.

Conventional plasticizer extraction is cumbersome and not very effective, because presently, submersion, vacuum and heat drying are required. Conventional extraction is accomplished by submersion of laminate structure in a liquid solvent. Extraction also occurs under vacuum while heating to 90–150° C. If emersion extraction is used, the cells must be dried for 1–5 hours under vacuum in an oven at 45–150° C. The aforesaid extraction methods for forming electrodes and electrolyte separator films are costly, cumbersome, and time-consuming.

Advantageously, the new plasticizer extraction method of the invention is highly flexible and compatible with conventional methods for preparing the electrolyte/separator (separator) and electrode films. Recall that a number of variations are presently used. In one alternative, a solution comprising polymer and plasticizer is formed. A preferred plasticizer is dibutyl phthalate (DBP). Then, the separator is formed, preferably by casting, and the plasticizer is optionally removed. The positive electrode and negative electrode are also formed, incorporating active materials and the same or similar polymer binder and plasticizer, as was used for the separator. The plasticizer is optionally removed from any or all films. The three cast films are laminated together. In a second alternative, the separator and positive and negative electrode films are formed, then laminated together, then the plasticizer is extracted from the laminated assembly. In a third alternative, steps similar to the second alternative are followed, except that the plasticizer is extracted any time before activation of the cell, and cells are stored after lamination with the plasticizer present. The plasticizer is removed just before the electrolyte solution is added to the cell to activate the cell. The plasticizer extraction method of the invention is compatible with these conventional techniques, although a preferred technique is described immediately below.

In a preferred method, the separator (membrane) and electrode compositions are each prepared using the preferred VdF:HFP binder. The separator composition contains the VdF:HFP polymer and the plasticizer. The electrode compositions each comprise the active material, an optional conductive diluent, the VdF:HFP polymer and the plasticizer. The separator and electrodes are cast using a conventional casting solvent such as THF. The films are then laminated. Next, the plasticizer is extracted.

EXAMPLE

Figure 2:
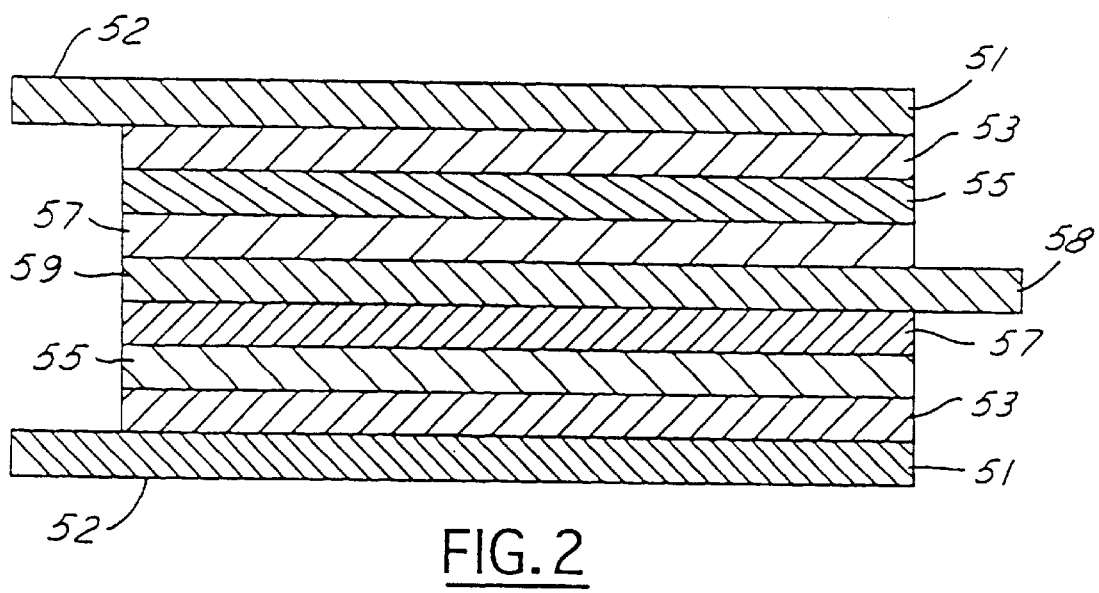
FIG. 2 is an illustration of a multicell structure for a battery embodying the invention.

Typical formulations for casting separator and electrode films are given in Table 1. The following is an exemplary method used for preparing cells, including bicells having conventional design of FIG. 2. Appropriate casting solutions were formed for the respective films of compositions given in Table 1. The first step comprised casting the films and laminating the films into electrode separator assembly using metal foil current collectors, and then stacking and laminating electrodes into the bicell design. (FIG. 2). Here, the layers are in order; current collector, negative electrode, separator membrane, positive electrode, current collector, positive electrode, separator membrane, negative electrode, and current collector, to form a unitary battery structure. Next, the plasticizer was extracted from laminated cells using supercritical extraction. Then the cells were activated with electrolyte salt solution as is conventional practice. Cells prepared by the method described here, and as tested, had 530 square centimeters electrode area. About 104+/–5 grams per square meter coat weight anode, of which 60 weight percent (dry) is graphite (BG-35). About 241+/–12 grams per square meter coat weight cathode, of which 65 weight percent (dry) is active material. The solvent is comprised primarily of EC/DMC, with a co-solvent added for further stability.

In a preferred method for making a battery structure, the following steps were followed. A positive electrode was formed of a copolymer of VdF and HFP, and LiMn$_2$O$_4$ active material, conductive carbon, and DBP plasticizer. A negative electrode was prepared from a copolymer of Vdf and HFP, carbonaceous active material, conductive carbon and DBP. A separator membrane was formed of a copolymer of VdF and HFP with DBP and fumed silica. The electrodes and the separator membrane were laminated together under heat and pressure to form a unitary battery structure.

Figure 3:
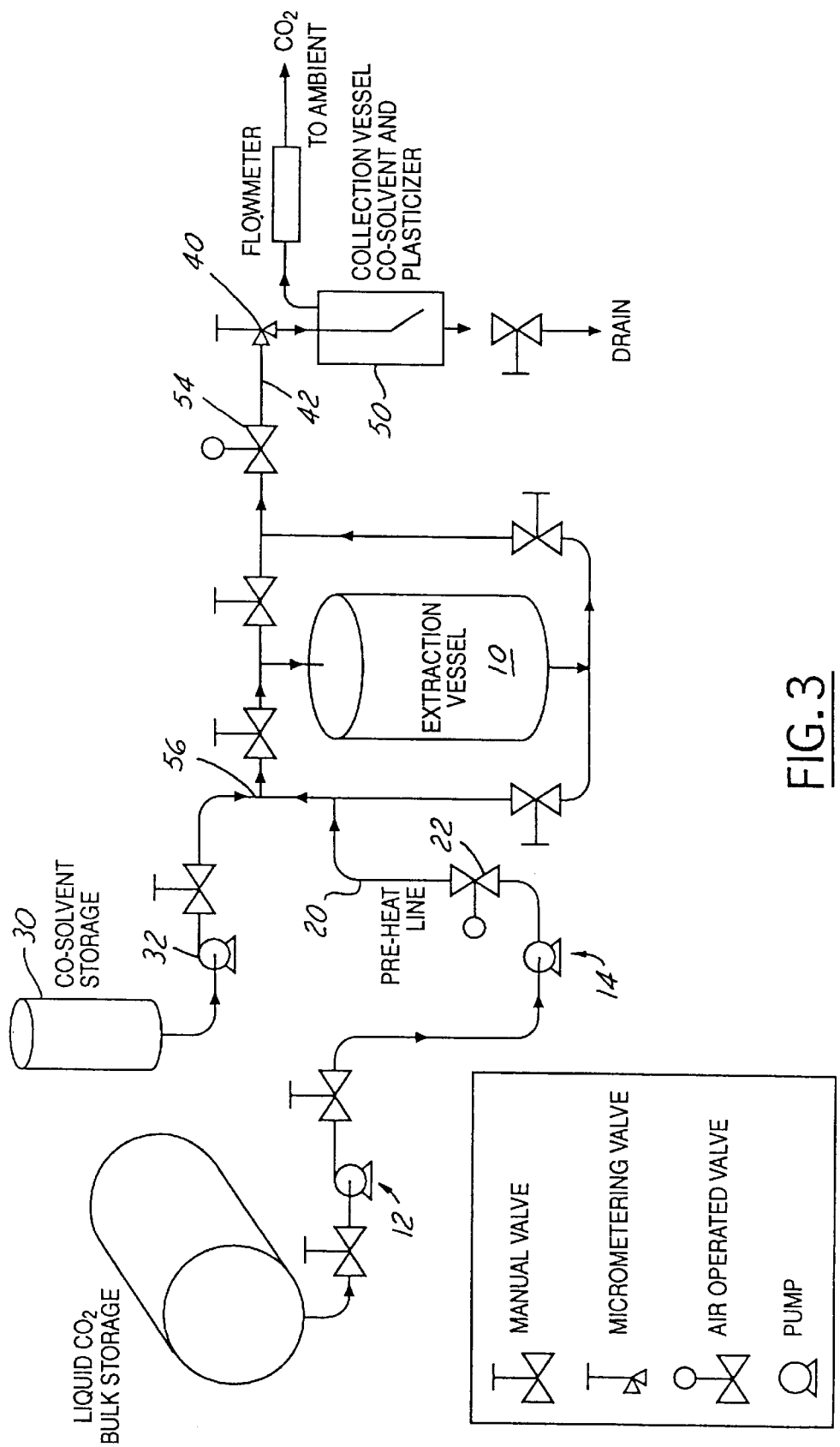
FIG. 3 is a schematic flow diagram showing a process and means employed for carrying out extraction, using supercritical carbon dioxide and co-solvent, according to the invention.

The plasticizer, the exemplary DBP, was extracted from lithium polymer battery structures by the use of supercritical carbon dioxide using a preferred co-solvent, methanol. Referring to FIG. 3, bicells are loaded into extraction vessel 10. Liquid carbon dioxide was supplied via pumps 12 and 14. Here, pressure was slowly increased, over a preferred 15-minute period; that is, ramped up to an operating pressure of 1800–2500 psi. An air operated valve 54 downstream of the extraction vessel was closed to allow pressure to build up statically. In this example, the pressure was held to as near 1850 psi as possible, because best extraction was observed at about 1850 psi. The carbon dioxide was preheated and supplied via preheat line 20 through air-operated valve 22 so that the carbon dioxide was preheated to a temperature near its critical temperature (31° C.), prior to entering the extraction vessel 10. The co-solvent from storage tank 30 was supplied via pump 32 and mixed with the carbon dioxide stream in line 56 prior to entering the extraction vessel. The co-solvent was added at 5 weight percent. In other words, the co-solvent represented 5 weight percent of the combined co-solvent and $CO_2$ stream.

Once the system was pressurized to the preferred 1850 psi, the downstream valve 54 was opened and flow was regulated by micrometering valve 40. The system was maintained from this point in a dynamic flow condition with fresh carbon dioxide/co-solvent fed to the system and with carbon dioxide/co-solvent/extracted DBP removed from the system via line 42. A pressure reduction occurs at micrometering valve 40. As pressure was reduced, carbon dioxide became a gas, and the co-solvent and DBP dropped out of the stream into collection vessel 50.

The dynamic portion of the extraction process continually exposed the bicells to fresh carbon dioxide/co-solvent extraction mixture. The amount of time during which the bicells were exposed to the dynamic extraction portion of the process was approximately 20 minutes. Once the bicells were exposed for a time sufficient to reduce the DBP level to an acceptable range, the supply pumps 12, 14, 32 were shut off and the pressure in the extraction vessel 10 was reduced. The pressure in the system was reduced over an approximate 30 minute time period. It was found that bicells were damaged if pressure was reduced too quickly. Specifically, at the end of the dynamic portion of the run, the addition of the co-solvent alcohol was first stopped, and then the pressure was slowly reduced. The pressure was reduced slowly, because if the $CO_2$ in the pressurized cells is released too fast, delamination results. This is similar to the phenomena of "bends" caused by release of gas pressure too rapidly, after a period of time in a compressed atmosphere. Once the pressure of the system had returned to ambient, the cells were removed from the extraction vessel and sent for further processing. Advantageously, the bicells are ready for packaging and testing. Therefore, bicells can be immediately placed in a vapor-proof package. Activation may then occur by adding electrolyte (lithium salt in organic solvents) and sealing the package. After a brief soak period (approximately 1 hour), the bicell can be placed on electrical testing.

Based on the experimental data described below, it has been unexpectedly discovered that there are dramatic differences in the solubility of the plasticizer in the $CO_2$/co-solvent, with varying operational parameters. This is contrary to previous teachings, since the optimum temperature found here is outside a range previously thought effective, and the art provided no guidance at all as to selection of co-solvent or pressure.

Table 2 shows performance of bicells prepared in accordance with this example, by extraction of DBP in a solvent comprising carbon dioxide and methanol. The relative proportion of carbon dioxide to DBP on a weight basis was 300:1 of $CO_2$:DBP. The solvent consisted of 5% by weight methanol and 95% by weight $CO_2$. The extraction was carried out at 1850 psi, and at a temperature of 33° C. The lithium manganese oxide/graphite cells were cycled from about 0 to 4.2 volts at about 0.1–1.0 milliamps per square centimeter. In accordance with Table 2, it can be seen that a very low first cycle loss on the order of 18 to 20% was observed for batteries extracted with supercritical carbon dioxide and co-solvent under the stated conditions. This performance is very attractive, as will be seen with respect to comparative data below.

Figure 4:
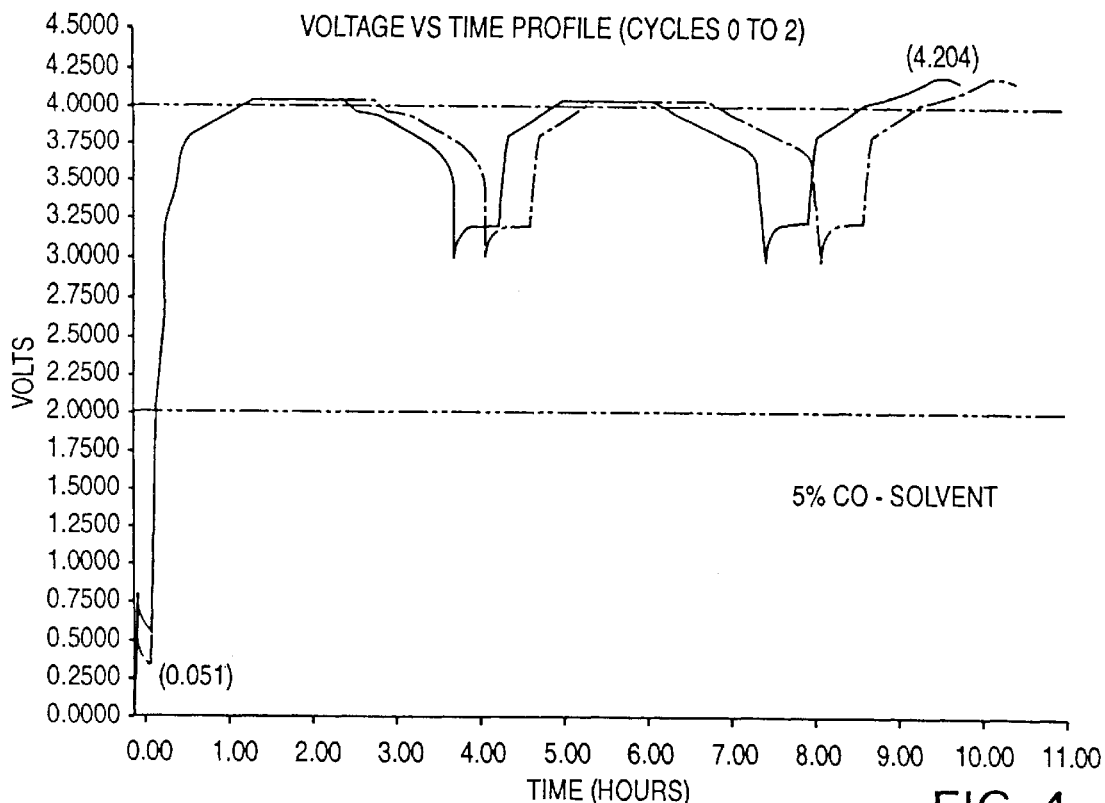
FIG. 4 is a graph of potential over time for cycles 0 to 2 of an LMO (nominally $LiMn_2O_4$)/graphite cells prepared according to the invention. The conditions of FIG. 4 include 1.0 milliamps per square centimeter; voltage limit 0 to 4.2 volts. In the formulation of FIG. 4, the DBP plasticizer was essentially completely removed to a level of 300–600 ppm, for the test cells shown. The extractant for the plasticizer was $CO_2$ and co-solvent.

FIG. 4 shows the actual cycling curves, voltage versus time, for cycles 0–2, for some cells from Table 2. Here, four cells were tested but data was incomplete for two -cells. The attractive performance is seen to be maintained not just on the first cycle but also on the second cycle. Based on this performance, the attractive cyclic performance is expected to maintain itself for subsequent cycles.

Figure 5:
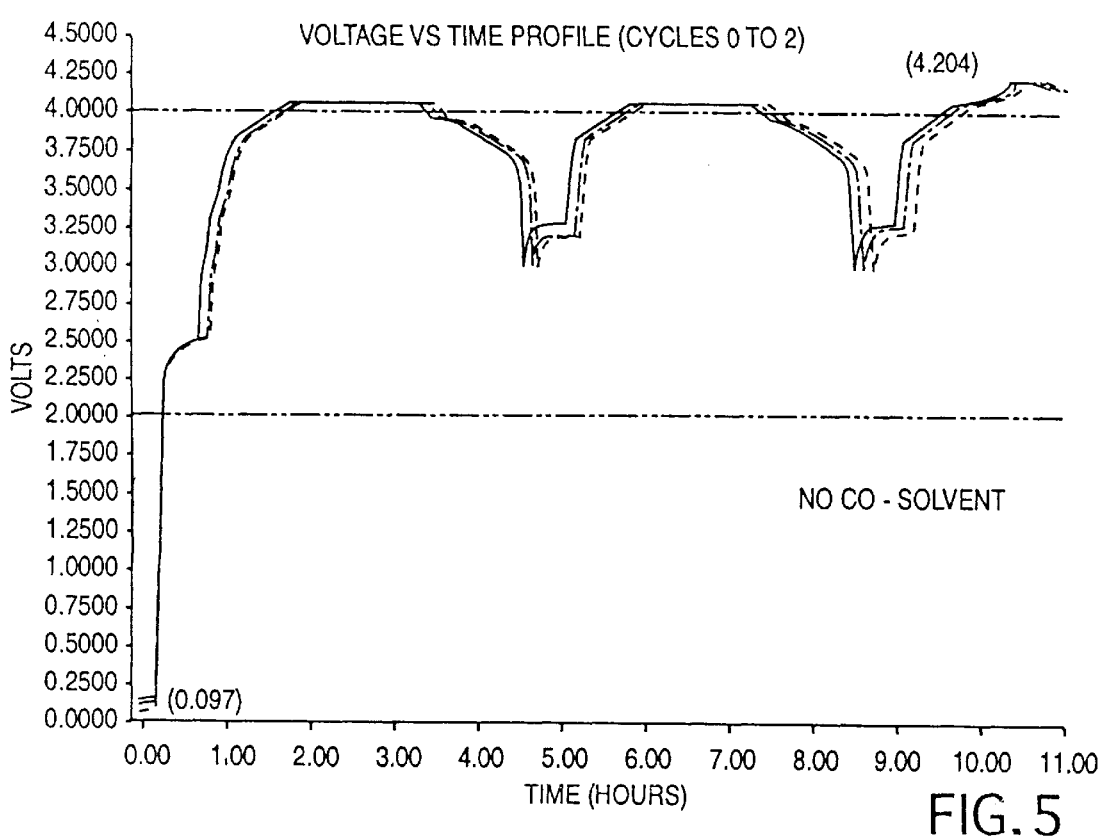
FIG. 5 (comparative) is a graph of potential over time for cycles 0 to 2 of an LMO (nominally $LiMn_2O_4$) graphite cells prepared as per FIG. 4, but extracted only with $CO_2$, without co-solvent. The conditions of FIG. 5 include 1.0 milliamps per square centimeter; voltage limit 0 to 4.2 volts. In the formulation of FIG. 5, a considerable amount of DBP remained unextracted. The remaining DBP was, significantly, 5500–8500 ppm.

Table 3 shows comparative data where LMO graphite bicells were prepared in a process which included extraction only with carbon dioxide and without the use of a co-solvent. The conditions of extraction were $CO_2$:DBP of 300:1 by weight; 1850 psi pressure, and 33° C., which are the same conditions as stated for the data in Table 2, except that here no co-solvent was used. The cells were cycled from 0 to 4.2 volts at approximately 1.0 $mA/cm^2$. According to the data shown in Table 3, the first cycle loss is very high, on the order of 27 to 40%. This very high first cycle loss (batteries extracted without addition of co-solvent) is strikingly poor when compared to Table 2 (batteries extracted with carbon dioxide and co-solvent). The first cycle loss in Table 3 is problematic because it represents an initial loss of capacity that cannot be recovered. This incomplete extraction is also evidenced by a "kneel" at approximately 2.5 volts in the voltage versus time profile curve of FIG. 5. Here, four cells show the same deficiency. Comparing the voltage versus time profiles of FIGS. 4 and 5 for batteries extracted with and without co-solvent, further demonstrates that more complete plasticizer removal occurs under the unique conditions of the invention.

TABLE 1

TYPICAL FORMULATIONS FOR CASTING
ELECTROCHEMICAL CELL BATTERY FILMS

| | APPROXIMATE MASS | |
|---|---|---|
| Constituent | Before Casting | Before Extraction |
| SEPARATOR | | |
| Fumed Silica | 5 | 5 |
| Polymer | 10 | 10 |
| Plasticizer | 15 | 15 |
| Solvent | 70 | |
| ELECTRODE | | |
| Active Material | 35 | 35 |
| Conductive Carbon | 3 | 3 |
| Polymer | 5 | 5 |
| Plasticizer | 10 | 10 |
| Solvent | 50 | |

Note that the cathode (positive electrode) active material is lithium manganese oxide (LMO) and the anode (negative electrode) active material is graphite. The approximate mass of electrode constituents are the same in each case. After casting and before extraction, film is dried to remove casting solvent, so that the before-extraction separator film contains about 44 wt % plasticizer and each electrode film contains about 21 wt % plasticizer. Thus, before extraction, the bicell (FIG. 2) contains about 25 wt % plasticizer before extraction.

TABLE 2

$CO_2$/methanol extraction

| Serial No. | 1st charge cap [mAh] | 1st disch. cap [mAh] | 1st cycle loss [%] | 2nd cycle cap [mAh] |
|---|---|---|---|---|
| B802713 | 0.808 | 0.645 | 20 | 0.641 |
| B802714 | 0.839 | 0.670 | 20 | 0.662 |
| B802715 | 0.807 | 0.645 | 20 | 0.639 |
| B802716 | 0.849 | 0.670 | 21 | 0.661 |
| B803016 | 0.840 | 0.686 | 18 | 0.674 |
| B803013 | 0.788 | 0.647 | 18 | 0.642 |

P = 1850 PSI
T = 33° C.
$CO_2$:DBP 300:1
5 wt % methanol/95 wt % $CO_2$
0 to 4.2 volts
1.0 mA/cm$^2$

TABLE 3

$CO_2$ extraction

| Serial No. | 1 charge cap [mAh] | 1 disch. cap [mAh] | 1 cycle loss [%] | 2 cycle cap [mAh] |
|---|---|---|---|---|
| B729601 | 0.824 | 0.592 | 28 | 0.580 |
| B729602 | 0.878 | 0.531 | 40 | 0.519 |
| B729603 | 0.876 | 0.532 | 39 | 0.516 |
| B802104 | 0.895 | 0.628 | 30 | 0.625 |
| B802105 | 0.888 | 0.631 | 29 | 0.625 |
| B802107 | 0.896 | 0.637 | 29 | 0.627 |
| B802110 | 0.866 | 0.637 | 27 | 0.631 |

P = 1850 PSI
T = 33° C.
$CO_2$:DBP 300:1 by wt
0 to 4.2 volts
1.0 mA/cm$^2$

TABLE 4

$CO_2$ extraction 600:1 of $CO_2$:DBP

| sample id | ppm/DBP (in bicell) |
|---|---|
| 8.1.1aco2 | 7993 |
| 8.1.2aco2 | 6988 |
| 8.1.3aco2 | 10143 |
| 8.1.4aco2 | 9868 |
| 8.1.5aco2 | 12654 |
| 7.2.1aco2 | 2174 |

P = 1850 psi
T = 33° C.
$CO_2$:DBP 600:1 by wt

TABLE 5

$CO_2$/methanol extraction

| sample id | ppm/DBP (in bicell) |
|---|---|
| C18.3a | 382 |
| C18.3b | 576 |
| C18.4a | 495 |
| C18.4b | 546 |

P = 1850 PSI
T = 33° C.
$CO_2$:DBP wt ratio = 300:1
5 wt % methanol/95 wt % $CO_2$

TABLE A

| Temperature | 40° C. |
|---|---|
| Pressure | 2200 psi |
| Co-solvent addition (wt % during dynamic flow) | 10% |

| Bicell # | Residual plasticizer (ppm) |
|---|---|
| C1.1 | 2140 ppm |
| C1.2 | 1698 ppm |
| C1.3 | 2011 ppm |
| C1.4 | 1910 ppm |
| C1.5 | 1876 ppm |

TABLE B

| Temperature | 40° C. |
|---|---|
| Pressure | 2200 psi |
| Co-solvent addition (wt % during dynamic flow) | 1% |

| Bicell # | Residual plasticizer (ppm) |
|---|---|
| C2.1 | 2331 ppm |
| C2.2 | 2100 ppm |
| C2.3 | 2300 ppm |
| C2.4 | 2100 ppm |
| C2.5 | 2765 ppm |

TABLE C

| Temperature | 40° C. |
|---|---|
| Pressure | 1800 psi |
| Co-solvent addition (wt % during dynamic flow) | 10% |

| Bicell # | Residual plasticizer (ppm) |
|---|---|
| C3.1 | 2022 ppm |
| C3.2 | 2447 ppm |
| C3.3 | 2716 ppm |
| C3.4 | 1960 ppm |
| C3.5 | 2631 ppm |

TABLE D

| Temperature | 33° C. |
|---|---|
| Pressure | 2200 psi |
| Co-solvent addition (wt % during dynamic flow) | 10% |

| Bicell # | Residual plasticizer (ppm) |
|---|---|
| C5.1 | 980 ppm |
| C5.2 | 911 ppm |
| C5.3 | 1166 ppm |
| C5.4 | 1200 ppm |
| C5.5 | 884 ppm |

TABLE E

| Temperature | 33° C. |
|---|---|
| Pressure | 1800 psi |
| Co-solvent addition (wt % during dynamic flow) | 10% |

| Bicell # | Residual plasticizer (ppm) |
|---|---|
| C7.1 | 586 ppm |
| C7.2 | 458 ppm |
| C7.3 | 454 ppm |

TABLE E-continued

| | |
|---|---|
| Temperature | 33° C. |
| Pressure | 1800 psi |
| Co-solvent addition (wt % during dynamic flow) | 10% |

| Bicell # | Residual plasticizer (ppm) |
|---|---|
| C7.4 | 490 ppm |
| C7.5 | 587 ppm |

TABLE F

| | |
|---|---|
| Temperature | 35° C. |
| Pressure | 1800 psi |
| Co-solvent addition (wt % during dynamic flow) | 10% |

| Bicell # | Residual plasticizer (ppm) |
|---|---|
| F813901 | 2115 ppm |
| F813902 | 1684 ppm |
| F813903 | 1634 ppm |
| F813904 | 1868 ppm |
| F813905 | 1412 ppm |

NOTE: All data in Tables 1–6 was obtained by extraction at a weight ratio of $CO_2$:DBP of 300:1.

The data of Tables 4 and 5 were developed using a spectrophotometer to measure residual plasticizer in a battery after extraction. Tables 4 and 5 illustrate actual data from the analysis of several batteries. The residual plasticizer remaining after extraction is represented by the column labeled "ppm/DBP in bicell". Table 4 shows the results of extraction under the following conditions: temperature 33° C., pressure 1850 psi, carbon dioxide extractant alone, and a weight ratio of carbon dioxide to DBP of 600:1. In Table 4, residual plasticizer ranges from 2174 ppm to 12,654 ppm. This comparative extraction test was done in order to determine whether highly excessive amounts of carbon dioxide could yield acceptably low levels of residual plasticizer. In accordance with the data shown in Table 4, it can be seen that the residual plasticizer was highly variable and even excessive quantities of carbon dioxide did not reliably reduce the residual amount of plasticizer.

In contrast to Table 4, Table 5 shows the results of plasticizer extraction under the conditions of a solvent solution of, by weight, 95:5 of $CO_2$:methanol; $CO_2$:DBP weight ratio of 300:1; pressure of 1850 psi; and temperature of 33° C. As can be seen with respect to Table 5, very little DBP remained in the cells extracted using the co-solvent. By this method, the residual plasticizer was reduced to a level of 300–600 ppm. This is far superior to the extraction using excessive $CO_2$ without a co-solvent. (See Table 4, over 12,000 ppm residual plasticizer).

Tables A through F contain additional test results for extraction under the following conditions. $CO_2$:DBP weight ratio of 300:1, co-solvent, methanol present in the weight percent indicated in the tables, and varying temperatures and pressures as shown in the tables. Tables A and B are both at 40° C., 2200 psi. The difference is, in Table A, 10% methanol was used, whereas in Table B, only 1% methanol was used. A comparison of Tables A and B shows that solvent ratio is a factor, but does not appear to be a critical factor in effectiveness of extraction.

Comparing Tables A and D, it can be seen that temperature plays a critical role in determining the effectiveness of extraction. In Tables A and D, the pressure is 2200 psi and 10 weight percent methanol is used. The temperatures differ, with Table A being at 40° C. and Table D being at 33° C. It can be seen that half as much plasticizer remained under the conditions of Table D at 33° C. as compared to Table A at 40° C. In Tables D and E, the extraction temperature was 33° C. and the methanol was 10 weight percent. Here, the pressure differed. More DBP was extracted at the lower pressure, (1800 psi), as compared to the higher pressure (2200 psi).

Although pressure influenced the level of extraction, its influence is not as great as temperature. This further can be seen by comparing Tables C and E. In Tables C and E, the pressure of extraction was 1800 psi, and methanol was at 10 weight percent. In Table E, the extraction temperature was 33° C., in Table C it was 40° C. Over four times more residual plasticizer remained at the higher temperature (40° C.) as compared to the lower temperature (33° C.). The most efficient extraction occurred at 33° C. Therefore, it can be seen that temperature plays a critical role. In Tables 5 and E, extraction was at 33° C. and 1800–1850 psi. In Table E, 10% methanol was present. In Table 5, 5% was present. In each case, the effectiveness of extraction is within overlapping ranges. Therefore, solvent weight ratio does not appear to be critical within the ranges tested here.

To further demonstrate the criticality of temperature in the extraction process, an additional extraction test was conducted at 35° C., 1800 psi, and 10 weight percent methanol, with $CO_2$:DBP ratio of 300:1 (Table F). Table E may be directly compared to Table F. In Tables E and F, the pressure was 1800 psi, and methanol was present at 10 weight percent of the co-solvent. In Table E, the extraction temperature was 33° C., whereas in Table F it was 35° C. The 35° C. extraction temperature is considerably less effective than the 33° C. extraction temperature. Three to five times as much residual plasticizer remained in the cells at the higher extraction temperature of 35° C. when compared to 33° C.

Based on experiments, it was found that optimum extraction occurs at a temperature of greater than or equal to 31° C., and less than 35° C. The preferred temperature is about 33° C. It was also found that a suitable weight ratio of carbon dioxide solvent to plasticizer DBP ranges from about 200:1 to 400:1, and preferably is 300:1. Co-solvent was found to be acceptable at up to 10% weight, based on the total amount of carbon dioxide and co-solvent (alcohol/methanol). A range of 0.5 to 10% co-solvent is desirable. A solvent mixture of 95% $CO_2$/5% methanol was optimum. Optimum co-solvent amount was determined on the basis that too little co-solvent resulted in incomplete extraction, while too much co-solvent yields no added benefit and was economically unattractive.

One significant advantage of the present extraction process is that, after extraction, the films are not wet. In other words, the films are not saturated with an extraction solvent and, therefore, they can be used immediately. This means that after extraction, the bicell is in condition for use and need not be dried before addition of the electrolyte and use of the bicell. This is in contrast to conventional extraction by submersion in the solvent. This is also in contrast to extraction by the method of the invention using an amount of organic co-solvent which is outside the range of up to 10 weight percent preferred in the present invention. It has been found that when the amount of organic co-solvent is on the order of 15 weight percent or more, a drying step is needed after extraction.

Therefore, it has been unexpectedly discovered that dramatic differences in solubility of the plasticizer in the extractant is dependent on temperature. Temperature is critical to the extraction performance. The temperature range suggested by these results falls outside and is contrary to what was expected, based on what was previously known in the art.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. In a method for forming a solid film comprising a polymer and plasticizer and then removing the plasticizer from said film, the improvement comprising:

extracting said plasticizer from said film by contacting said film with an extraction solvent mixture comprising carbon dioxide and an organic polar co-solvent, said carbon dioxide, $CO_2$, being in a solvent fluidic state at a temperature greater than or equal to 31° C. and less than 35° C., and at a pressure to maintain said fluidic state at said temperature, with said co-solvent present in an amount up to about 10 percent by weight of said extraction solvent mixture, and said co-solvent characterized by having a liquid state at said temperature and pressure.

2. The method of claim 1 wherein the pressure is in a range of about 1800 to about 2500 psi.

3. The method of claim 1 wherein the pressure is in a range of about 1800 psi to about 2200 psi.

4. The method of claim 1 wherein the pressure is in a range of about 1800 psi to about 1900 psi.

5. The method of claim 1 wherein the temperature is in a range of 31° C. to 34° C.

6. The method of claim 1 wherein the temperature is in a range of 32° C. to 34° C.

7. The method of claim 1 wherein the temperature is in a range of 32.5° C. to 33.5° C.

8. The method of claim 7 wherein the temperature is about 33° C.

9. The method of claim 1 wherein said polymer is a copolymer of vinylidene fluoride, VF, and hexafluoropropylene, HFP.

10. The method of claim 1 wherein said plasticizer is selected from the group consisting of dibutyl phthalate, dimethyl phthalate, diethyl phthalate, trisbutoxyethyl phosphate, propylene carbonate, ethylene carbonate, trimethyl trimellitate and mixtures thereof.

11. The method of claim 1 wherein said plasticizer is dibutyl phthalate, DBP.

12. The method of claim 1 wherein said plasticizer is dibutyl phthalate, DBP, and the weight ratio of $CO_2$: DBP is 200:1 to 400:1.

13. The method of claim 1 wherein said polymer is selected from the group consisting of polymer and copolymers of vinyl chloride, acrylonitrile, vinyl chloride and vinylidene chloride, vinyl chloride and acrylonitrile, vinylidene fluoride, vinylidene fluoride with hexafluoropropylene, vinylidene fluoride with hexafluoropropylene and a member of the group consisting of vinyl fluoride, tetrafluoroethylene, and trifluoroethylene.

14. The method of claim 1 wherein said co-solvent is an organic polar solvent selected from the group consisting of alcohols, ethers and ketones.

15. The method of claim 1 wherein said co-solvent is selected from the group consisting of methyl alcohol, ethyl alcohol, propyl alcohol, butyl alcohol, and mixtures thereof.

16. The method of claim 1 wherein said co-solvent has a boiling point, bp, of at least 50° C. at atmospheric pressure 760 mmHg and a molecular weight less than 200.

17. The method of claim 1 which further includes forming at least two said films laminated together to form a laminated structure where at least a portion of said plasticizer is extracted from said laminated structure.

18. In a method of making a laminated structure comprising:

forming a first electrode comprising a first polymer, a first plasticizer and a first active material;

forming a second electrode comprising a second polymer, a second plasticizer and a second active material;

forming a separator membrane comprising a third polymer and a third plasticizer;

bonding said electrodes and said separator membrane to form a unitary battery structure;

extracting at least a portion of said plasticizer from said structure;

the improvement comprising:

contacting said structure with an extraction solvent mixture comprising carbon dioxide and alcohol, said carbon dioxide being in a solvent fluidic state at a temperature greater than or equal to 31° C. and less than 35° C., and at a pressure to maintain said fluidic state at said temperature, with said alcohol present in an amount up to about 10 percent by weight of said extraction solvent mixture.

19. The method of claim 18 wherein said first, second and third polymers are the same.

20. The method of claim 18 wherein at least two of said first, second and third polymers are different.

21. The method of claim 18 wherein said first, second and third plasticizers are the same.

22. The method of claim 18 wherein at least two of said first, second and third plasticizers are different.

23. The method of claim 18 wherein said first and second active materials are different.

* * * * *